United States Patent [19]
Beam

[11] Patent Number: 5,811,732
[45] Date of Patent: *Sep. 22, 1998

[54] MODULAR WIRING SYSTEM FOR VEHICLE INSTRUMENT PANEL WIRE

[75] Inventor: William M. Beam, Rochester Hills, Mich.

[73] Assignee: Chrysler Corporation, Auburn Hills, Mich.

[ * ] Notice: The term of this patent shall not extend beyond the expiration date of Pat. No. 5,442,518.

[21] Appl. No.: 358,633

[22] Filed: Dec. 19, 1994

Related U.S. Application Data

[63] Continuation of Ser. No. 989,868, Dec. 14, 1992, abandoned.

[51] Int. Cl.⁶ .................................................. H02G 1/00
[52] U.S. Cl. ........................ 174/72 A; 174/95; 174/97; 361/627; 361/826
[58] Field of Search .................. 174/72 A, 72 R, 174/95, 96, 97, 98, 99 R, 70 C; 307/10.1; 361/826.7, 627

[56] References Cited

U.S. PATENT DOCUMENTS

| | | | |
|---|---|---|---|
| 2,082,099 | 6/1937 | Cruser | 174/72 A X |
| 2,896,213 | 7/1959 | Alderman et al. | |
| 3,082,984 | 3/1963 | Larsson et al. | 174/72 A X |
| 3,393,350 | 7/1968 | Goudy et al. | 174/72 A X |
| 3,471,629 | 10/1969 | O'Leary | 174/49 |
| 3,571,863 | 3/1971 | Logan | 174/72 A X |
| 3,710,480 | 1/1973 | Royse et al. | |
| 3,956,822 | 5/1976 | Folk | |
| 4,189,619 | 2/1980 | Pedlow | 174/48 |
| 4,210,773 | 7/1980 | Haley et al. | 174/72 A |
| 4,255,610 | 3/1981 | Textoris | 174/48 |
| 4,271,573 | 6/1981 | von Roesgen | |
| 4,461,061 | 7/1984 | Rock | |
| 4,522,114 | 6/1985 | Matsuno | 174/47 |
| 4,703,543 | 11/1987 | Aceti et al. | |
| 4,750,265 | 6/1988 | Watanabe et al. | 29/854 |
| 4,815,984 | 3/1989 | Sugiyama et al. | 174/72 A X |
| 4,820,189 | 4/1989 | Sergeant et al. | 439/395 |
| 4,824,164 | 4/1989 | Nakayama et al. | 174/72 A X |
| 4,942,499 | 7/1990 | Shibata et al. | 174/72 A X |
| 4,943,241 | 7/1990 | Watanabe et al. | 174/72 A X |
| 5,442,518 | 8/1995 | Beam | 174/72 A X |

FOREIGN PATENT DOCUMENTS

| | | | |
|---|---|---|---|
| 3820724 | 12/1989 | Germany | 174/255 |
| 0155120 | 6/1990 | Japan | 174/135 |

OTHER PUBLICATIONS

Mitchell et al. "Cable Enclosure", May 1970, p. 2293, IBM Technical Disclosure Bulletin, vol. 12, No. 12.

*Primary Examiner*—Hyung S. Sough
*Attorney, Agent, or Firm*—Roland A. Fuller, III

[57] ABSTRACT

A wiring system for a vehicle instrument panel, which includes a plurality of electronic subassembly components electrically connected to at least one wire, is encapsulated in a plurality of troughs located to the rear of the instrument panel. The troughs extend between the subassembly components, Each trough has a finite length in at least one axial direction with an open side extending substantially along the length, so that the at least one wire may be received within the trough. The at least one wire is connected to at least one of the subassembly components. Wire restraints restrain the wire within at least one trough.

16 Claims, 2 Drawing Sheets

MODULAR WIRING SYSTEM FOR VEHICLE INSTRUMENT PANEL WIRE

This is a continuation of application(s) Ser. No. 07/989,868 filed on Dec. 14, 1992, now abandoned.

CROSS REFERENCE TO RELATED APPLICATIONS

This application is related to U.S. application Ser. No. 07/989,867, entitled "Wiring System for Vehicle Instrument Panel Wire Encapsulated in Reconfigured Ventilation System" filed on Dec. 14, 1992, also to U.S. application Ser. No. 07/993,543 entitled "Automotive Wire Feeding, Terminating and Cutting Device" filed on Dec. 21, 1992, and also to U.S. application Ser. No. 07/993,545 entitled "Automated Wire Feeding and Restraining", filed on Dec. 14, 1992.

FIELD OF THE INVENTION

This invention relates generally to a wiring system for vehicle instrument panel wire, and more particularly to a wiring system in which wires for electronic subassembly components for instruments displayed on a dashboard are restrained by a modular wiring board equivalent.

BACKGROUND OF THE INVENTION

A few years ago, the automotive industry began to reverse the trend, which it had begun almost twenty years before, of replacing dashboard gauges with small warning lights or so-called "idiot lights". In part this was due to the sophistication of electronic gauges. Electronics are now used in various subassembly components of the modern day vehicle instrument panel. Electronic modules are used as small on-board computers that monitor hundreds of inputs from various sensors on the vehicle. Many leads or wires are used to electrically convey information from sensors at the sources of the information to the electronic gauges, through relays monitored by the modules. Other electronic subassemblies, such as radios, message centers, power antennae relays, intermittent windshield wiper controls, electronic air conditioning switches and relays, and other subassembly components are also interconnected by leads and wiring to electrical sources and sensors.

Because of the sheer number of electrically conductive wires used to electronically connect the subassembly components to each other and to other vehicle electrical components, wiring harnesses are typically used to arrange the conductive wires in groups. The wiring harnesses are attached the instrument panel and routed along its substructure during assembly of the board or instrument panel. Wiring harnesses have the advantage of bringing some order to a spaghetti-like entanglement of wires, facilitating some tracing of the wires to allow for proper connections during assembly and to allow for trouble shooting such connections for repair.

While wiring harnesses have advantages over loose arrays of wires that are difficult to trace, wiring harnesses also have shortcomings. Manually attaching and routing the wiring harnesses is a tedious and labor intensive task. Furthermore, owing in part to the tediousness and labor intensiveness of the task, manual manipulation of the wiring harnesses during assembly often results in damage to the instrument panel, to the subassembly components, and to the wires themselves. Because of the number of subassembly components that must be electrically interconnected, it is of limited advantage to systematize the deployment of wires simply by restraining wires as is done by using wiring harnesses.

For example, bunching a number of wires in a wiring harness does not help in allowing work operations to be performed upon the ends of the wires. This shortcoming can be appreciated by considering the teaching of U.S. Pat. No. 3,956,822, issued to Folk on May, 18, 1976. Folk discloses a method and apparatus for positioning lengths of individual leads of a plurality of leads in spaced-apart relationships with respect to one another, so that work operations can be simultaneously performed on the ends of the leads. The lengths of leads are positioned in a plurality of spaced-apart grooves of a template by progressively positioning successive parts of the lengths of each of the plurality of leads into respective grooves. Each groove is wider and deeper than the lead positioned within the groove. Each of the grooves has one or more spaced-apart lead confining means that retain segments of the leads positioned in the groove. The template with its grooves are only employed to perform the work operations on the ends of the leads. When the work operations are complete, knockout pins are associated with each of the spaced-apart lead retaining means to facilitate stripping the leads from the template. Accordingly, a wiring harness does not facilitate end operations of leads, such as the installation of terminals.

Wiring boards have been used in other arts in which a myriad of wires interconnect electrical components. Wires may be attached to a wiring board on a printed portion of a circuit. This structure has the advantage of being easily traceable for diagnosis of electrical problems during manufacture and repair. But it also has disadvantages. For one, attaching wires to a wiring board, especially of the size necessary to service electrical subassembly components of an automobile instrument panel can be as labor intensive as routing a wiring harness. For another, once wires are attached and then detached for troubleshooting or repair, they are difficult to reattach and may be left to hang from the board. As will be disclosed herein, a system of grooves or troughs as used in the present invention has advantages over conventional wiring boards, just as it does over work templates and wiring harnesses.

OBJECTS OF THE INVENTION

Accordingly, it is an object of the present invention to provide an improved wiring system that has advantages over both work templates and wiring harnesses.

It is another object of this invention to provide an improved wiring system for vehicle instrument panel wire that is capable of restraining a plurality of vehicle instrument panel wires placed so that the wires are easily traceable for ease of assembly of subassembly components into the wiring system.

It is a further object of this invention to provide an improved wire restraining system for vehicle instrument panel wire.

SUMMARY OF THE INVENTION

The instrument panel assembly includes a plurality of electrical and electronic subassembly components that are associated with the instrumentation displayed on the instrument panel or dashboard of a vehicle, including an electronic message center, a power antenna, an intermittent windshield wiper control, an electronic air conditioning control, a radio and tape deck, an electronic voice alert, an illuminated entry relay, a fuse box and other gauges, components, and switches mounted on or in proximity to a dashboard structure.

The subassembly components are each assembled into a structural and electrical connection with the instrument panel assembly at associated docking stations. Some of the subassembly components are fitted into these docking stations formed into the dashboard structure and others situated to the rear of the vehicle instrument panel. Each subassembly component has a built-in connector that interfits with a connector situated at each docking station.

The rear of the vehicle instrument panel assembly exposes a wiring system for vehicle instrument panel wire. The wiring system comprises a series of walled channels or troughs, with wires shown routed within the series of channels or troughs. Each trough is defined by a floor extending along a longitudinal axis. Two side walls extend perpendicularly outwardly away from the floor. The side walls are laterally spaced to define the width of the trough. Opposite the floor is an open ceiling to the trough.

Each trough may be traced along its longitudinal extent to other troughs or groups of troughs that branch out from one or more troughs. The wires may be laid out in the troughs to trace circuits that connect with subassembly components and/or into other troughs in which wires are traceable to connectors that interfit with subassembly component connectors. Each trough has a finite length and extends in a path in an axial direction and may extend into a plurality of branches of troughs, with each branch extending in a different axial direction depending on the location of the subassembly components that are docked into the wiring system. Thus, the wiring system is modular in that each of troughs may be formed to a standard length and the lengths pieced together to form branches of troughs. The troughs may be sized by piecing together standard lengths to form runs longer than the length of a single standard length trough or by cutting standard lengths for form shorter runs or a combination of these techniques to form desired lengths of runs. Troughs may be sized according to specifications for each length desired, without a standard length, and may be structured into a supporting wiring board.

Each trough may contain one or many wires. The size of a trough may be different from another trough, depending on the number of wires to be placed in the trough. Notwithstanding the number of wires placed in each trough, each wire is individually a connecting part of a wiring circuit and is placed individually in the wiring system. Each connector is attached to a plurality of terminals, each terminal providing an electrical connection for a single wire. The terminals are attached to the troughs, preferably with several terminals being an integral part of a connector.

Each wire is restrained within the trough by restraining means made up of a number of component parts, including ledges and/or flexible clips that span over the open ceiling of a trough and adhesives attaching wires to the floor of the trough.

DETAILED DESCRIPTION OF THE PREFERRED EMBODIMENT

Figure 1:
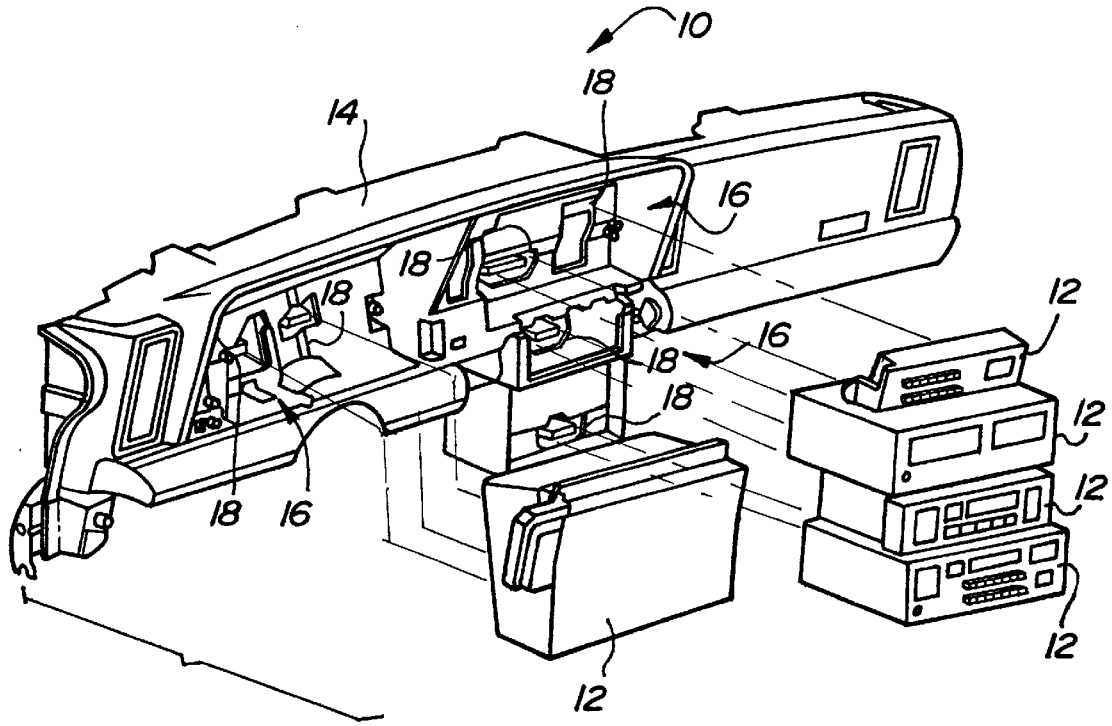
FIG. 1 is a perspective front view of a vehicle instrument panel incorporating the present invention.

Reference is now made to the drawings and, in particular, to FIG. 1, in which the front view of a vehicle instrument panel assembly 10 is seen. The instrument panel assembly 10 includes a plurality of electrical and electronic subassembly components 12 that are associated with the instrumentation displayed on the instrument panel or dashboard of a vehicle. The subassembly components 12 include such disparate electrical and electronic instruments, components, and other assemblies, as an electronic message center, a power antenna, an intermittent windshield wiper control, an electronic air conditioning control, a radio and tape deck, an electronic voice alert, an illuminated entry relay, a fuse box and other gauges, components, and switches known to those of ordinary skill in the automotive arts. The subassembly components 12 are mounted on or in proximity to a dashboard structure 14.

The subassembly components 12 are each assembled into a structural and electrical connection with the instrument panel assembly 10 at associated docking stations 16. The subassembly components 12 are fitted into these docking stations 16, some of which are a part of the dashboard structure 14 of the instrument panel assembly 10. These docking stations 16 are formed into the dashboard structure 14 as wells shaped for respective subassembly components 12. Others of the docking stations 16 are situated to the rear of the vehicle instrument panel 10, as will be disclosed shortly. As will also be explained and as may be viewed from the rear of the vehicle instrument panel 10, each subassembly component docked in a docking station 16 is connected to a connector 18. Each subassembly component 12 has a built-in connector 19 that interfits with a connector 18 situated at each docking station 16.

Figure 2:
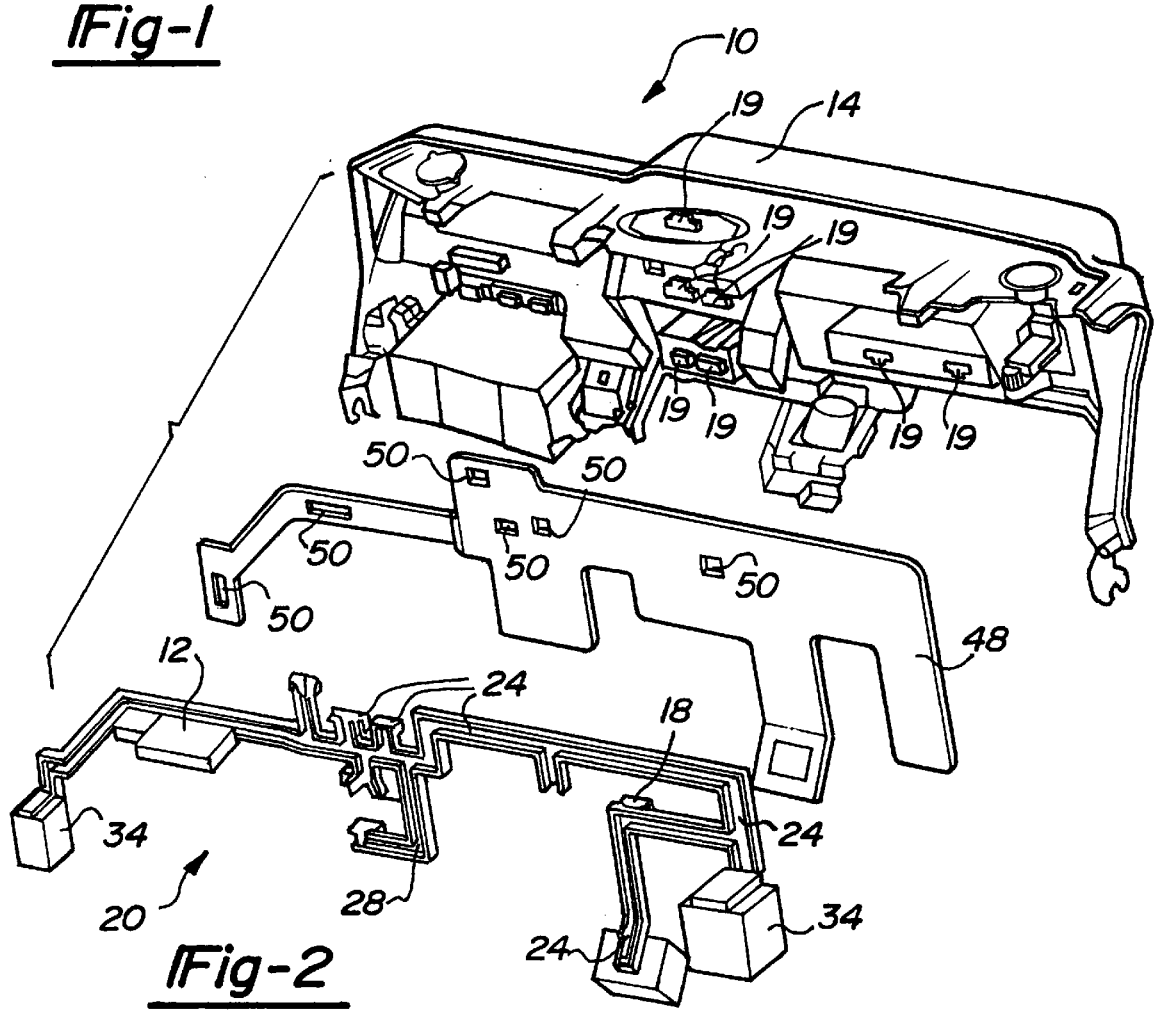
FIG. 2 is a perspective rear view of a vehicle instrument panel incorporating the present invention.

Referring now to FIG. 2, the rear of the vehicle instrument panel assembly 10 is seen. The rear of the vehicle instrument panel assembly 10 exposes a wiring system 20 for vehicle instrument panel wire. Instrument panel assembly 10 includes the dashboard structure 14 and others of the plurality of electrical assembly components 12 that are associated with the instrumentation displayed on the face of the dashboard. The subassembly components 12 are interconnected and/or connected to other electrical and electronic components by a plurality of wires 22 attached to the connectors 18 that interfit with the connectors 19 of the subassembly components 12 and other electrical components to be disclosed.

Figure 3:
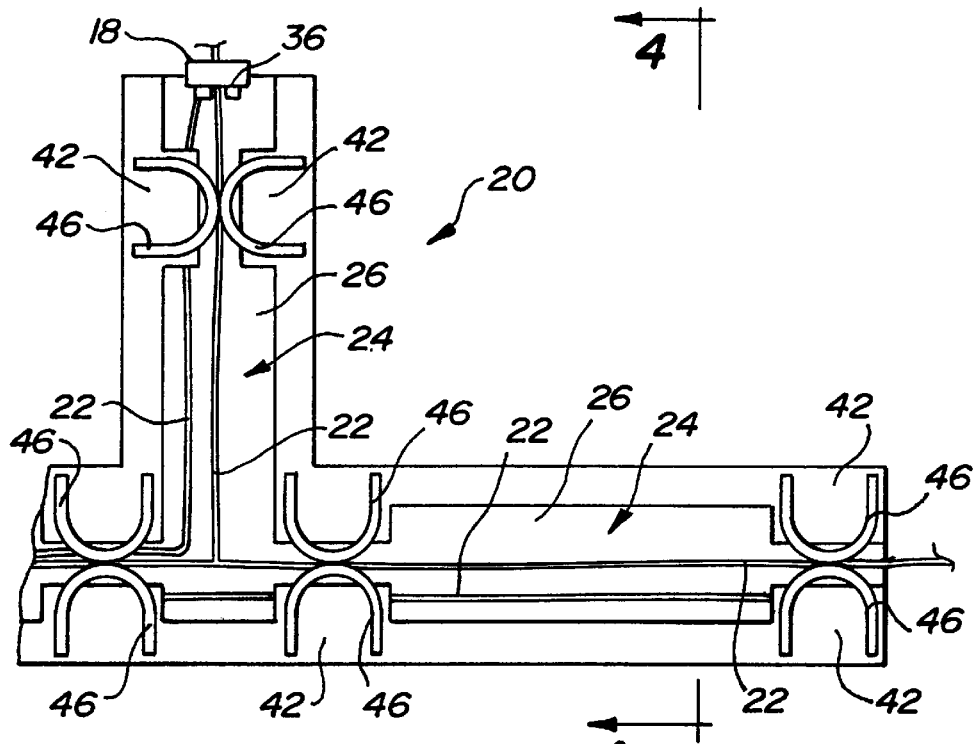
FIG. 3 is a fragmentary plan view of a wiring system for vehicle instrument panel wire in accordance with the present invention.
Figure 4:
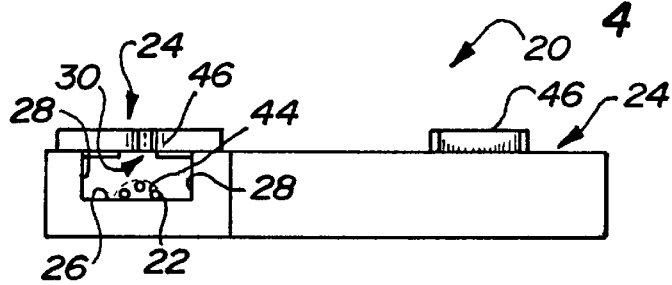
FIG. 4 is a cross-section of the wiring system of FIG. 3 taken in the direction of arrows 4—4 of FIG. 3.
Figure 5:
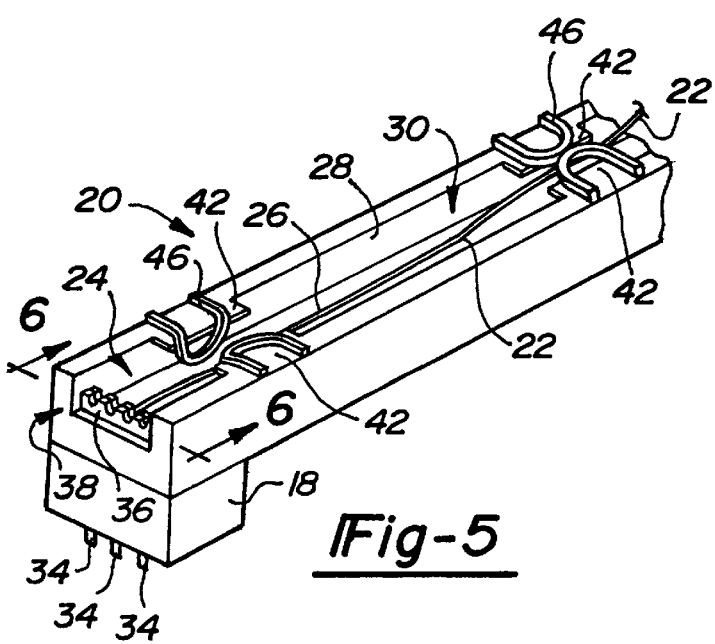
FIG. 5 is a fragmentary perspective view of a trough of the wiring system of FIGS. 3 and 4 in accordance with the present invention.

Referring still to FIG. 2, but now with the aid of FIGS. 3–5, the wiring system 20 comprises a series of walled channels or troughs 24, with wires 22 shown routed within the series of channels or troughs 24. Each trough 24 is defined by a floor 26 extending along a longitudinal axis. It is to be appreciated that the nomenclature "floor" has been chosen for purposes of relative orientation of structural parts of a trough 24. It is to be further appreciated that in normal use, a trough 24 may be orientated so that the floor 26 of the trough 24 is generally parallel to a vertical plane. In accordance with this convention, with regard only to the wiring system 20, which comprises troughs 24, the floor will be treated as if it were "below" the "ceiling" of the trough 24, as the ceiling will be later defined.

Two side walls 28 extend, then, perpendicularly to and upwardly, that is, outwardly away from the floor 26. The side walls 28 are laterally spaced to define the width of the trough 24. Opposite the floor 26, in accordance with the U-channel-like cross-section of the trough 24, is an open ceiling 30 to the trough 24. The open ceiling 30, as it is defined to be opposite the floor 26, extends the length of the floor 26 along the longitudinal axis of the trough 24. The open ceiling 30 is bounded by the edges of the walls 28 disposed outwardly from the floor 26 or the innermost edges of ledges 42, which will later be described as an optional feature of a means for restraining wires 22 within trough 24.

Each trough 24 may be traced along its longitudinal extent to other troughs or groups of troughs. This allows for branching of the troughs 24, so that the wires 22 may be laid out in the troughs 24 to trace circuits that connect with subassembly components 12 and/or into other troughs 24 in which wires 22 are traceable to connectors 18 that interfit with subassembly component connectors 19. The connectors 18 that interfit with the subassembly component connectors 19 are structurally and electrically incorporated into the wiring system 20. Each connector 18 serves the mating portion for the connector 19 of a subassembly component 12. The mating portion of each connector 18 is typically oriented toward a docking station 16 associated with the instrument panel assembly 10 for ease of access and connection. The connectors 18 are "floating" connectors known by those of ordinary skill in the art.

Each trough 24 has a finite length and extends in a path in an axial direction and may extend into a plurality of branches of troughs 24, with each branch extending in a different axial direction depending on the location of the subassembly components 12 that are docked into the wiring system 20. Thus, the wiring system 20 is modular in that each of troughs 24 may be formed to a standard length and the lengths pieced together to form branches of troughs 24. The troughs 24 may be sized by piecing together standard lengths to form runs longer than the length of a single standard length trough or by cutting standard lengths for form shorter runs or a combination of these techniques to form desired lengths of runs. Of course, troughs may be sized according to specifications for each length desired, without a standard length.

Figure 6:
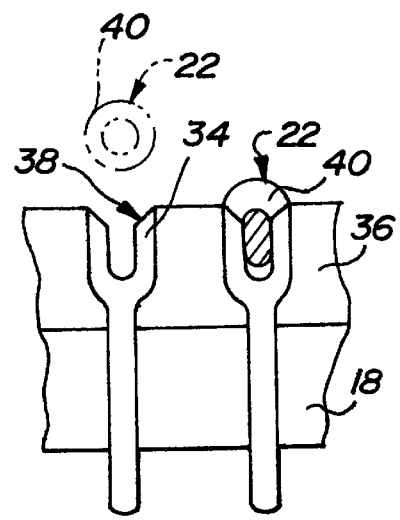
FIG. 6 is a fragmentary cross-sectional view taken in the direction of arrows 6—6 of FIG. 5.

Each trough 24 may contain one or several wires 22 or as many as two-hundred wires 22. The size of a trough 24 may be different from another trough 24, depending on the number of wires 22 to be placed in the trough 24. Notwithstanding the number of wires 22 placed in each trough, each wire 22 is individually a connecting part of a wiring circuit and is placed individually in the wiring system 20 in accordance with related U.S. patent application identified as "Automated Wire Feeding and Restraining" in the Related Patents section of this specification. In the preferred embodiment, most wires 22 originate from left and right body wiring modules 34, function as small on-board computers co-acting with the subassembly components 12. Each of the left and right body wiring modules 34 and each connector 18 is attached to a plurality of terminals 36, each terminal 36 providing an electrical connection for a single wire 22. The plurality of terminals include trough terminals 36 that are attached to the troughs 24. Preferably, several terminals 36 and a connector 18 are integral as one unit that includes a housing 37 insulating the terminals 36. The terminals 36 are insulation displacement terminals. As is known in the art, these terminals 36 have cutting edges 38 that cut through the insulation 40 of a wire 22, as shown in FIG. 6, when a wire 22 is forced down into the slot between cutting edges 38 of blades 34 in a terminal 36. Each terminal 36 extends to a electrical contacting part of a connector 18, again as is known in the art. In FIG. 6, a male connecting parts of terminals 36 extend from the connector 18, but it is understood that the connector 18 might have female parts electrically connected to terminals 36 and still be within the scope of the invention.

Each wire 22 is restrained within the trough 24 by restraining means made up of a number of component parts, all of which are not necessarily required in a single embodiment of the present invention. One component of the restraining means is the ledge 42 extending from each side wall 28. Each ledge 42 extends from each side wall 28 inwardly toward the opposite side wall 28 over a portion of the top open ceiling 30 to the trough 24. The ledges 42 function as a part of a restraining means to restrain the wires 22 within the trough 24. It should be appreciated that ledges 42 are optional in view of other components to the wire restraining means.

Another component of the restraining means is an adhesive 44 shown particularly in FIG. 4. The adhesive 44 is used to attach a wire 22 to the floor 12 of a trough 24. The adhesive 44 may be placed on the wire 22 or floor 26 in a variety of ways, such as by spreading adhesive 44 by a brush or the like. A preferred means is by selectively spraying the adhesive 44 onto each wire 22 as the wire 22 is placed in a trough 24. This method, which is disclosed in the related patent application referred to in the Related Patent Applications section of this specification above as "Automatic Feeding, Terminating and Cutting Device". By spraying each wire 22 with the adhesive 44, the wire 22 is adhesively attached to the floor 26 within trough 24.

With reference now particularly to FIGS. 3–5, yet another component of the restraining means is seen to comprise a pair of flexible clips 46 that are mounted over open ceiling 30 of trough 24. The pairs of flexible clips 46 are disposed in spaced relationship to other pairs of flexible clips 46 along the extension of each trough 24. The intervals of the spaced relationship are sufficient such that clips 46 restrain wires 22 within trough 24, whether or not the wires 22 are attached to the floor 26 of the trough 24 or restrained within the trough 24 by other means. A preferred measurement would have the pairs of flexible clips 46 spaced between six and twelve inches apart. Additionally, the pairs of flexible clips are to be mounted before and after each branching trough or troughs 24 into another trough 24 or other troughs 24, so that pairs of flexible clips are mounted at the beginning and end of the extent of a particular trough 24.

Each pair of flexible clips 46 cantilevers from either side of trough 24, that is, at the outer most extent of a wall 28 from floor 26. Optional ledges 42 may serve to support the flexible clips 46 as they cantilever over the open ceiling 30. Each flexible clip 46 bows out to roundedly engage an opposing clip 46. Accordingly, each clip 46 is in contact with an opposing clip 46 to provide an obstruction over open ceiling 30, thereby restraining wires 22 beneath the opposing pair of flexible clips 46. Each flexible clip 46 may be temporarily displaced to flex its rounded portion (the portion that engages the rounded portion of an opposing clip 46) away from the said opposing clip 46, so that each clip 46 is separated from the opposing flexible clip 46. Accordingly, displacement of flexible clips so that they are not in contact with one another in a paired arrangement opens open ceiling 30 of trough 24 to allow a wire 22 to be inserted into trough 24. The clips 46, when so displaced rebound to engage one another over open ceiling 30 of a trough 24, so that the newly inserted wire 22 is retained beneath opposing clips 46. Preferably, in order to provide the characteristics of flexibility and resiliency, the flexible clips 46 are made of a low density polyethylene.

With reference yet again to FIG. 2, in accordance with the structure just described for the preferred embodiment of the present invention, the wiring system 20 is used in conjunction with a wiring board 48 to provide structural integrity for the wiring system 20. The wiring board 48 may be of any suitable low weight, semirigid material such as a pressed cardboard. Openings 50 are provided in the wiring board 48 so that the connectors 18 have thru access to the socking stations 16 for connection with the subassembly component connectors 19. The troughs 24 are attached to the wiring board 48 by adhesive or other connecting devices, such as screws, known in the art. Alternatively, troughs 24 may be manufacture integrally into wiring board 48, particularly if wiring board 48 is made of a molded material such as plastic. In such case, the troughs 24 may be recessed into the wiring board 48. The wiring board 48 may then be attached to the instrument panel assembly 10 screws, clips or other known fasteners.

It should be understood that the side walls 28 and floor 26 that define the boundaries of a trough 24, as shown in the drawings to have a sharp, rectangular cross-section, may be chamfered or rounded, and each trough 24 itself may have curved inner surfaces at the joinder of the floor 26 with side walls 28. Other modifications may be made to trough 24 to improve retention of the wires 22, to simplify manufacturing operations, or to reduce the amount of material required for construction of the structure housing the troughs 24. The troughs 24, as defined and illustrated, are intended only to form a basis for understanding the structure required to retain wires 22 in accordance with the invention.

I claim:

1. A wiring board structure for vehicle instrument panel wiring connected to instruments displayed on the front portion of a vehicle instrument panel and for subassembly components located to the rear of the vehicle instrument panel, the wiring board structure comprising:

a wiring board for encapsulating said wiring including at least one trough attached to said wiring board, said at least one trough having a finite length in at least one axial direction, said at least one trough extending along said axial direction and having an opening extending substantially along the entire said finite length;

means for restraining said at least one wire within said at least one trough, said restraining means including at least two pairs of flexible clips disposed in spaced relationship one pair to another along the extension of said at least one trough, each clip of said at least two pairs of flexible clips extending transversely over said opening of said axially extending trough, wherein said clips are flexible in the axial direction of said at least one trough; and said trough having a wire connector as an integral part thereof said wire connector adapted for electrical contact with said at least one wire, said wire connector having a wire receiving means, said wire receiving means including a slot having an open end opening to said opening of said at least one trough, whereby said wire receiving means is adapted to receive said at least one wire through said open end of said slot.

2. A wiring system for a vehicle instrument panel including a plurality of subassembly components, each subassembly component of said plurality of subassembly components being electrically connected to at least one wire, the wiring system comprising:

a structure including at least one trough adapted to receive said at least one wire, said at least one trough having a finite length in at least one axial direction, said at least one trough having an opening extending substantially along the entire said finite length;

a plurality of flexible clips disposed in spaced relationship one pair to another along said finite length of said at least one trough, each said clip extending transversely over said opening of said at least one trough, wherein each said clip is flexible in the axial direction of said at least one trough; and said structure having a wire connector as an integral part thereof, said wire connector adapted for electrical contact with said at least one wire, said wire connector having a slot adapted to receive said at least one wire, said slot having an open end opening to said opening of said at least one trough, said slot having a blade disposed therein adapted for cutting an insulation layer on said at least one wire.

3. The wiring system of claim 2 wherein said at least one trough is of sufficient cross sectional area to restrain a plurality of said at least one wire.

4. The wiring system of claim 2 wherein said at least one trough includes a plurality of branches, each said branch extending in a separate axial direction, said branches for routing said at least one wire to distinct positions on the vehicle instrument panel.

5. The wiring system of claim 2 wherein said slot is generally U-shaped, a portion of said slot being adapted to contact a conductive portion of said at least one wire when said at least one wire is inserted therein.

6. The wiring system of claim 2 wherein said at least one trough includes a floor having a width, and a first and second side walls extending outwardly from said floor to outer side wall edges, said side walls being laterally spaced from one another at a distance of said width of said floor.

7. The wiring system of claim 6 wherein said first side wall is generally parallel to said second side wall.

8. The wiring system of claim 6 wherein said at least one trough includes a ledge extending from one of said outer edges of one of said side walls, said ledge extending toward the opposing side wall and partially over said trough.

9. The wiring system of claim 6 wherein said trough further comprises a first ledge extending from said first side wall, and a second ledge extending from said second side wall, said first ledge and said second ledge being in a common plane.

10. A modular wiring system for a vehicle instrument panel including a plurality of electronic subassembly components, each subassembly component being electrically connected to a wire, the system comprising:

a trough having a finite length and an opening extending substantially along said length for receiving the wire, said trough including a plurality of branches, each said branch extending in a separate axial direction, said branches for routing said wire to distinct positions on the vehicle instrument panel;

a plurality of ledges extending from said trough transversely over said opening to partially enclose said trough, said ledges disposed spaced apart from each other substantially along the finite length of said trough; and a clip cooperating with each said ledge to restrain said wire within said trough, each said clip overlapping and contacting its respective said ledge, each said clip extending transversely over said opening of said trough a distance greater than its respective said ledge, each said clip being flexible in the axial direction of said trough.

11. The wiring system of claim 10 wherein said trough is of sufficient cross sectional area to restrain a plurality of the wires.

12. The wiring system of claim 10 wherein each said clip is formed of low density polyethylene.

13. The wiring system of claim 10 wherein a wire connector is integrally disposed in said trough, said wire connector adapted for electrical contact with the wire, said wire connector having a slot adapted to receive the wire, said slot being within said trough having an open end oriented toward said opening of said trough.

14. The wiring system of claim 10 wherein said trough includes a floor having a width, and a first and second side walls extending outwardly away from said floor to an outer side wall edge, said side walls being laterally spaced from one another at a distance of said width of said floor.

15. The wiring system of claim 14 wherein said first side wall is generally parallel to said second side wall.

16. The wiring system of claim 14 wherein a first set of said ledge extend from said outer edge of first side wall, and a second set of said ledges extend from said outer edge of said second side wall, said first set of ledges and said second set of ledges being in a common plane.

* * * * *